United States Patent
Devara

(10) Patent No.: US 7,210,157 B2
(45) Date of Patent: Apr. 24, 2007

(54) APPARATUS AND METHOD OF PROGRAM CLASSIFICATION USING OBSERVED CUES IN THE TRANSCRIPT INFORMATION

(75) Inventor: Kavitha Devara, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 909 days.

(21) Appl. No.: 09/739,476

(22) Filed: Dec. 18, 2000

(65) Prior Publication Data

US 2002/0078452 A1  Jun. 20, 2002

(51) Int. Cl.
*H04N 7/16* (2006.01)

(52) U.S. Cl. .......................... 725/18; 725/19; 725/20; 725/136

(58) Field of Classification Search ............ 725/18–20, 725/136–137
See application file for complete search history.

(56) References Cited

U.S. PATENT DOCUMENTS

| 4,857,999 | A | | 8/1989 | Welsh ........................ 358/84 |
| 5,371,807 | A | * | 12/1994 | Register et al. ............ 382/159 |
| 5,481,296 | A | | 1/1996 | Cragun et al. ............... 348/13 |
| 5,561,457 | A | | 10/1996 | Cragun et al. ............... 348/13 |
| 5,737,532 | A | | 4/1998 | DeLair et al. .............. 395/200 |
| 5,818,510 | A | | 10/1998 | Cobbley et al. ............... 348/7 |
| 5,835,667 | A | * | 11/1998 | Wactlar et al. ............... 386/96 |
| 5,859,662 | A | | 1/1999 | Cragun et al. ............... 348/13 |
| 6,580,437 | B1 | * | 6/2003 | Liou et al. ................. 345/719 |

FOREIGN PATENT DOCUMENTS

| EP | 0780777 A1 | 6/1997 |
| EP | 0903676 A2 | 3/1999 |
| WO | 9936863 A2 | 7/1999 |
| WO | 9941684 A1 | 8/1999 |
| WO | 0039707 A1 | 7/2000 |

OTHER PUBLICATIONS

Wei et al, Integrating visual, audio and text analysis for news video, Sep. 10-13, 2000, IEEE, Image Processing, 2000. Proceedings. 2000 International Conference On . . ., vol. 3 pp. 520-523.*
PHA 23,832, U.S. Appl. No. 09/441,943, filed Nov. 17, 1999.
PHA 23,839, U.S. Appl. No. 09/441,949, filed Nov. 17, 1999.
"Aspects of Multimedia Retrieval", by Mohamed Abdel-Mottaleb et al., Philips Journal of Research, vol. 50, No. ½, 1996, pp. 227-251.

* cited by examiner

Primary Examiner—Kieu-Oanh Bui

(57) ABSTRACT

A method for classification of a program includes receiving transcript information associated with the program, identifying at least one cue of a plurality of cues in the transcript information wherein each of the plurality of cues has associated therewith a type of program, correlating the at least one cue of the plurality of cues identified in the transcript information to the type of program, and classifying the program based on the correlation of the at least one cue of the plurality of cues identified in the transcript information.

7 Claims, 1 Drawing Sheet

APPARATUS AND METHOD OF PROGRAM CLASSIFICATION USING OBSERVED CUES IN THE TRANSCRIPT INFORMATION

BACKGROUND OF THE INVENTION

1. Field of the Invention

The present invention is directed to the classification of programs, and more specifically to the classification of television programs using observed cues in transcript information.

2. Description of the Related Art

Television program classification is known and is used in many apparatus and methods which analyze television broadcast signals. Traditionally, the classification of a program is determined by electronic programming guide (EPG) data included with the television broadcast signal. However, when the EPG data is not available or is not included with the television broadcast signal, the program classification cannot be readily identified. Furthermore, finer classification for various retrieval/browsing purposes is not easy with just EPG information.

OBJECTS AND SUMMARY OF THE INVENTION

It is therefore an object of the present invention to provide a method which classifies the type of program based on observed cues in transcript information provided with the program signal.

It is another object of the present invention to provide a method which classifies the type of program without using EPG data.

It is a further object of the present invention to provide a method for classifying a program which overcomes inherent disadvantages of known program classification methods.

In accordance with one form of the present invention, the method for classification of a program includes receiving transcript information associated with the program, identifying at least one cue of a plurality of cues in the transcript information, each of the plurality of cues having associated therewith a type of program, correlating the at least one cue of the plurality of cues identified in the transcript information to the type of program, and classifying the program based on the correlation of the at least one cue of the plurality of cues identified in the transcript information.

The above and other objects, features and advantages of the present invention will become readily apparent from the following detailed description thereof, which is to be read in connection with the accompanying drawings.

DETAILED DESCRIPTION OF THE PREFERRED EMBODIMENTS

Figure 1:
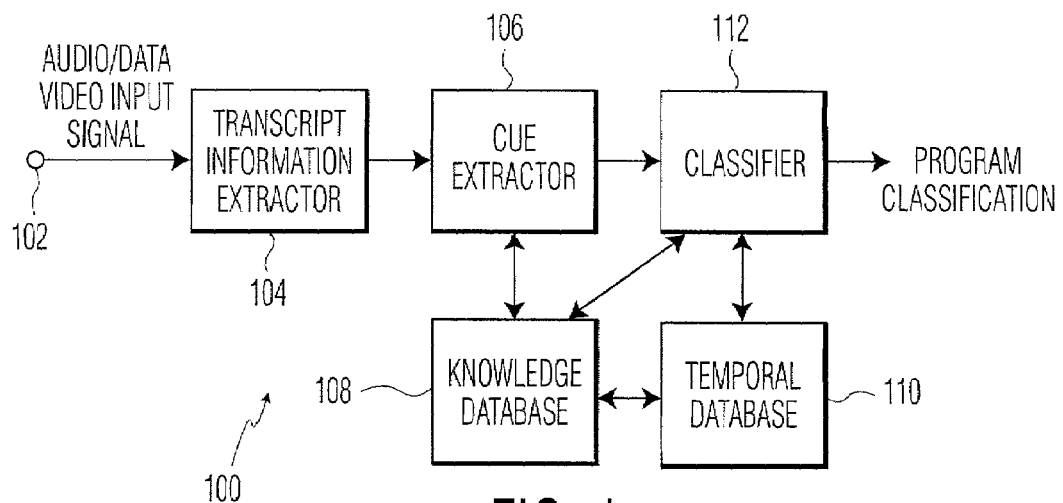
FIG. 1 is a block diagram of the system for program classification using observed cues in the transcript information according to the present invention.

Referring now to FIG. 1 of the drawings, a preferred embodiment of the apparatus of the present invention will now be described. The apparatus 100 includes a video input port 102 for receiving an audio/data/video signal which preferably includes transcript information. Coupled to the video input port 102 is a transcript information extractor 104 which extracts the transcript information from the audio/data/video input signal. If the audio/data/video input signal does not include transcript information (e.g. closed-captioned text), then the transcript information can be generated using known speech-to-text generation techniques (or obtained from a third party source). Once the transcript information portion of the input signal is extracted, it is provided to a cue extractor 106 for analysis.

The cue extractor 106 is coupled to a knowledge database 108 which contains a plurality of sets of cues, each set of cues being relevant to a particular classification type of program. The cue extractor monitors the transcript information for the occurrence of the cues present in the knowledge database. The cues generally relate to sentences, phrases or words which indicate that some event is about to occur or has occurred in the program. The following is an example of the types of cues which would be identified in the transcript information for a talk show.

Introduction cues: e.g. first guest, next guest . . .

Intermediate cues: e.g. please welcome, the one the only . . .

Bridging cues indicating a commercial: e.g. we'll be right back . . .

Exit cues: e.g. good night folks, next week, thank you for watching . . .

A temporal database 110 is coupled to the knowledge database and provides the cue extractor with information as to how close in time specific cues should be located. If a "second" in-time cue is not identified within a specific predetermined time after identification of a "first" in-time cue, the apparatus determines that the "first" in-time cue was improperly identified or that the "second" in-time cue was missed. Therefore, these cues are discarded and the cue extractor identifies a new set of "first" and "second" cues. However, if the "second" cue is identified within the specific predetermined time period identified by the temporal database, then the "first" and "second" cues are stored in memory and it is noted that they indicate a specific type of program. Once the pre-determined time period for analysis of the transcript information has lapsed, a determination is made by a classifier 112 to see which program type has more matches to the cues extracted from the transcript information. The program type which has the highest number of cues identified is determined by the classifier 112. The corresponding program type is output as the program classification.

Figure 2:
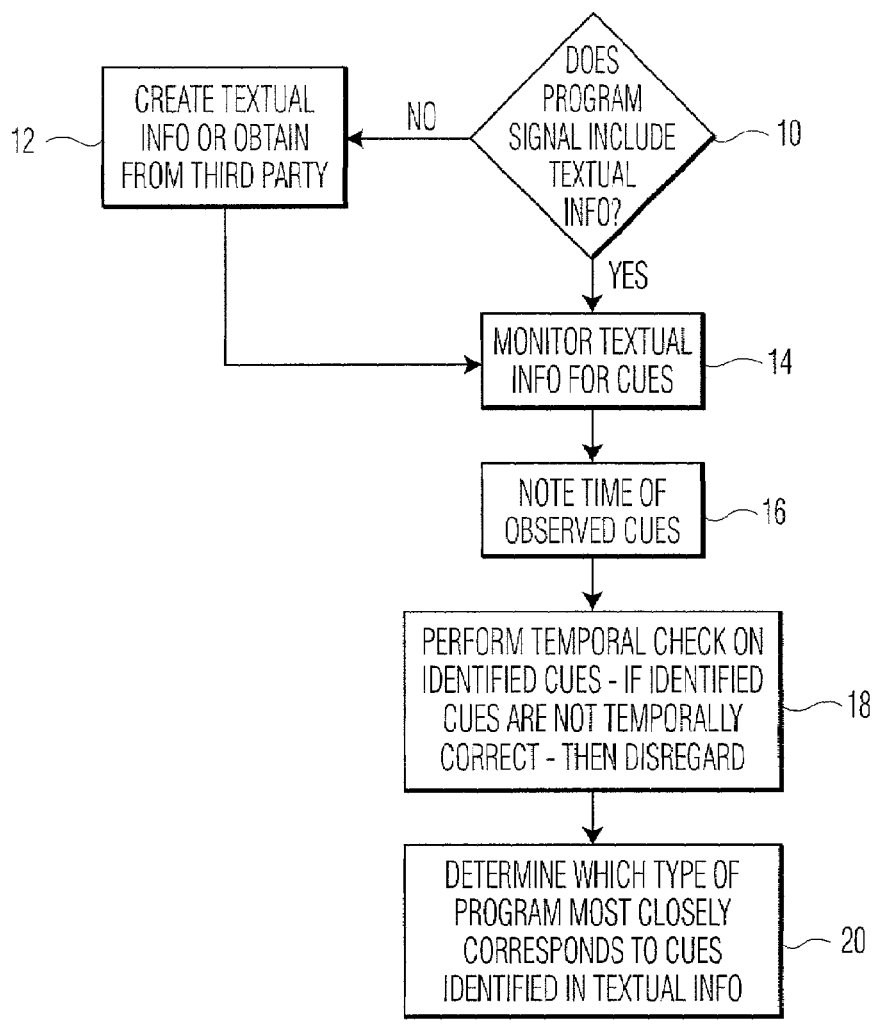
FIG. 2 is a flow diagram of the method for program classification using observed cues in the transcript information in accordance with the present invention.

Referring now to FIG. 2, the method for program classification based on observed cues in the transcript information is shown. The term transcript information is intended to indicate text, for example, closed-captioned text, which is to be provided with a video (televison) program's transmission (audio/data/video) signal and which corresponds to the spoken and non-spoken events of the video program, or other textual source like EPG data. The transcript informa- The determination of the type of program is made by comparing the cues identified in the transcript text (Step 20) to a look-up table (knowledge database 108) which includes the type of program and the cues which should be present in the particular type program. The type of program which most closely corresponds to the proper temporally located cues (according to temporal database 110) identified in the transcript information is output as the program classification.

tion can be obtained from video text or screen text (e.g., by detecting the subtitles of the video) and applying optical character recognition (OCR) on the extracted text such as that discussed in U.S. Ser. No. 09/441,943 entitled "Video Stream Classification Symbol Isolation Method and System" filed Nov. 17, 1999, and U.S. Ser. No. 09/441,949 entitled "Symbol Classification with Shape Features Applied to a Neural Network" filed Nov. 17, 1999, the entire disclosures of which are incorporated herein by reference. If the audio/data/video signal does not include a text portion, (i.e., it does not include transcript information) transcript information can be generated using known techniques such as a speech-to-text conversion as known in the art. The transcript information could also be obtained from a third party source, for example, TV Guide via the internet.

The present invention is based on the knowledge that the transcript information is capable of being analyzed and searched using known searching techniques such as key-word searching and statistical text indexing and retrieval. Generally, the method includes analyzing the sentences of the transcript information to determine the presence of certain cues (i.e., words or phrases) which are indicative of a particular type of program. Based on this information and the known tendencies of specific types of programs (news program, talk show, sports program, panel discussions, interviews, sitcom) to have specific words or phrases in the transcript information, a determination is made as to the classification (type) of the program.

The method includes determining whether the broadcast (audio/data/video) signal corresponding to the program includes transcript information (Step 10). If the broadcast signal does not include transcript information (NO in Step 10) the transcript information is generated as stated above or is obtained from a third party source (Step 12).

Once the transcript information has been obtained, the transcript information is analyzed using known natural language processing methods such as key-word searching and statistical text indexing and retrieval to determine whether specific cues (i.e., words or phrases) are present in the transcript information (Step 14). The words and phrases (cues) which are searched for in the transcript information are preferably stored in a database of cues.

It is important to note that every sentence of the particular program need not be analyzed in order to classify the type of program. It has been found that an analysis of 30 seconds of transcript information (or about 5–10 sentences) is sufficient to provide a relatively high degree of accuracy in classifying the type of program. It should also be noted that the analysis of the textual information need not start at the beginning of the program, but could start at any portion of the program.

Once specific cues have been identified in the transcript information, the corresponding time of occurrence of each cue during the program is noted (Step 16). Thereafter, the occurrence of each cue identified in the transcript information and the corresponding time of occurrence during the program are compared to a database of information regarding the particular types of programs (Step 18). That is, if a particular cue corresponding to a specific phrase (e.g., the introduction of a first guest by a talk show host) is proximate in time to an associated cue (e.g., the guest walking on stage), then a determination is made that the two cues are related and valid, and can be used to assist in providing a determination as to the classification of the program. However, if cues which should appear in a particular type of program (e.g., talk show) but which should not be closely temporally located (e.g., a first cue being the talk show host stating "our first guest . . ." and a second cue wherein the talk show host states "goodnight, see you next time") are proximate one another, then the cues which are not properly temporally located are ignored. As a result, only the proper temporally located cues are considered when determining the program classification.

The determination of the type of program is made by comparing the cues identified in the transcript text to a look-up table (knowledge database 108) which includes the type of program and the cues which should be present in the particular type program. The type of program which most closely corresponds to the proper temporally located cues (according to temporal database 110) identified in the transcript information is output as the program classification.

Examples of some of the types of cues which are stored in the knowledge database and searched for in the transcript information related to new programs, sitcoms and talk shows are set forth below:

News Program→good morning, reporter, reporting, this is xxx reporting of xxx news, after we come back, when we come back we have, good night from all of us here;

Sitcom→cheers, applause, laughing, giggles, doorbell; and

Talk show→tonight's show, our first guest, our next guest, please welcome xxx.

Based upon the above example, it is clear that not only are specific spoken words searched for in the transcript information to identify the type of program, but footnotes in the transcript information which typically identify non-verbal sounds are also analyzed to classify the program. These additional non-verbal notes include, for example, a door bell, laughter, giggles, cheers and applause.

Having described the specific preferred embodiments of the invention with reference to the accompanying drawings, it will be appreciated that the present invention is not limited to those precise embodiments and that various changes and modifications can be affected therein by one of ordinary skill in the art without departing from the scope or spirit of the invention defined by the appended claims. For example, while the present invention is described in the context of its use with television broadcast signals, it is foreseen that the system can be utilized with audio processors (i.e., radios), computers that have internet accessibility so as to scan internet-based signals, or any stored content to create textural information which can be searched and processed in accordance with the present invention.

The invention claimed is:

1. A method for classification of a program comprising the steps of:
   receiving an audio/video signal corresponding to the program;
   determining transcript information associated with the program using the audio/video signal;
   identifying at least one cue in the transcript information and an associated time of occurrence, each of the cues being associated with a type of program;
   correlating the at least one cue identified in the transcript information to the type of program;
   comparing the time of occurrence of two cues selected from the at least one identified cue and determining a proximity of occurrence of the two selected cues,
      wherein if the proximity of occurrence is greater than a predetermined amount, the two selected cues are ignored in connection with determining the program classification; and
      wherein if the proximity of occurrence is not greater than the predetermined amount, the two selected cues are utilized in connection with determining the program classification; and classifying the program based on the proximity of occurrence of the two selected cues.

2. The method for classification of a program according to claim 1 further comprising the steps of:

receiving an audio/data/video signal which includes the transcript information.

3. The method for classification of a program according to claim 1, wherein the classification of the program is one of a news program, talk show, sports program, panel discussions, interviews, and situational comedy.

4. The method for classification of a program according to claim 1, wherein the transcript information comprises closed-captioned text.

5. Apparatus for classification of a program, comprising:

a receiver to receive an audio/data/video signal corresponding to the program;

a transcript information extractor for extracting transcript information associated with the program from the audio/data/video input signal;

a cue extractor for identifying at least one cue in the transcript information and an associated time of occurrence, each of the cues having associated therewith a type of program;

a knowledge database for correlating the at least one cue identified in the transcript information to the type of program;

a temporal database for comparing the time of occurrence of two selected cues, of the at least one cue to determine a proximity of occurrence of the two selected cues wherein if the proximity of occurrence is greater than a predetermined amount, the two selected cues are ignored in connection with determining the program classification; and wherein if the proximity of occurrence is not greater than the predetermined amount, the two selected cues are utilized in connection with determining the program classification; and a classifier for classifying the program based on the proximity of occurrence.

6. The apparatus for classification of a program according to claim 5, wherein the classification of the program is one of a news program, talk show, sports program, panel discussions, interviews, and situational comedy.

7. The apparatus for classification of a program according to claim 5, wherein the transcript information comprises closed-captioned text.

* * * * *